United States Patent [19]
Ritter

[11] Patent Number: 5,432,528

[45] Date of Patent: Jul. 11, 1995

[54] VIDEO COMBINER

[75] Inventor: Dave W. Ritter, Newark, Calif.

[73] Assignee: Abekas Video Systems, Inc., Redwood City, Calif.

[21] Appl. No.: 212,646

[22] Filed: Mar. 11, 1994

Related U.S. Application Data

[63] Continuation of Ser. No. 685,225, Apr. 12, 1991, abandoned.

[51] Int. Cl.6 .............................................. G09G 1/06
[52] U.S. Cl. .................................... 345/115; 348/585
[58] Field of Search ............... 345/139, 121, 114, 115, 345/113; 348/585, 586, 590, 591, 598, 578

[56] References Cited

U.S. PATENT DOCUMENTS

| | | | |
|---|---|---|---|
| 4,684,990 | 8/1987 | Oxley | 340/729 |
| 4,757,384 | 7/1988 | Nonweiler et al. | 358/160 |
| 4,758,892 | 7/1988 | Bloomfield | 358/183 |
| 5,070,403 | 12/1991 | Wilkinson | 358/163 |
| 5,121,210 | 6/1992 | Hirayama | 358/183 |

*Primary Examiner*—Ulysses Weldon
*Assistant Examiner*—Regina Liang
*Attorney, Agent, or Firm*—Limbach & Limbach

[57] ABSTRACT

A video signal combiner includes circuitry for generating a gleam key signal for keying a video image which has been spatially transformed, a plurality of multiplier circuits for simultaneously layering multiple key and video signals in parallel, and circuitry for dynamically maintaining or adjusting Z data priority as the fill video images are spatially transformed. A gleam key is generated in accordance with dynamic planar description data representing the dynamic planar positioning of the gleam within the resultant video image. The gleam key profile or contrast range can be selectively altered prior to its keying of the video image. The multiple key signals can be selectively prioritized relative to one another. The multiplier circuits share common output compensation circuits. Dynamic range for internally generated Z video data is maintained at the maximum range possible using normalized Z data.

22 Claims, 18 Drawing Sheets

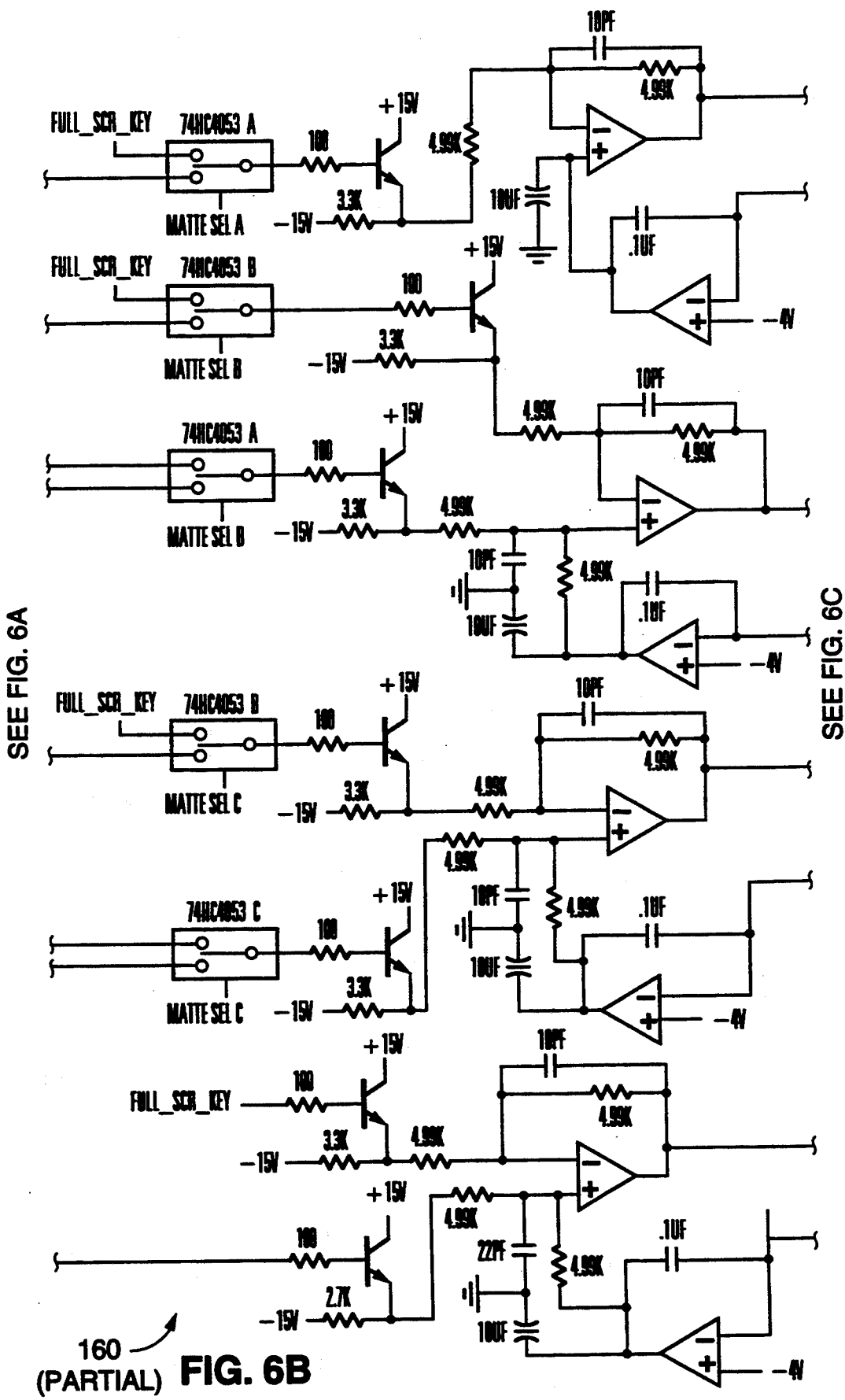
160
(PARTIAL) FIG. 6B

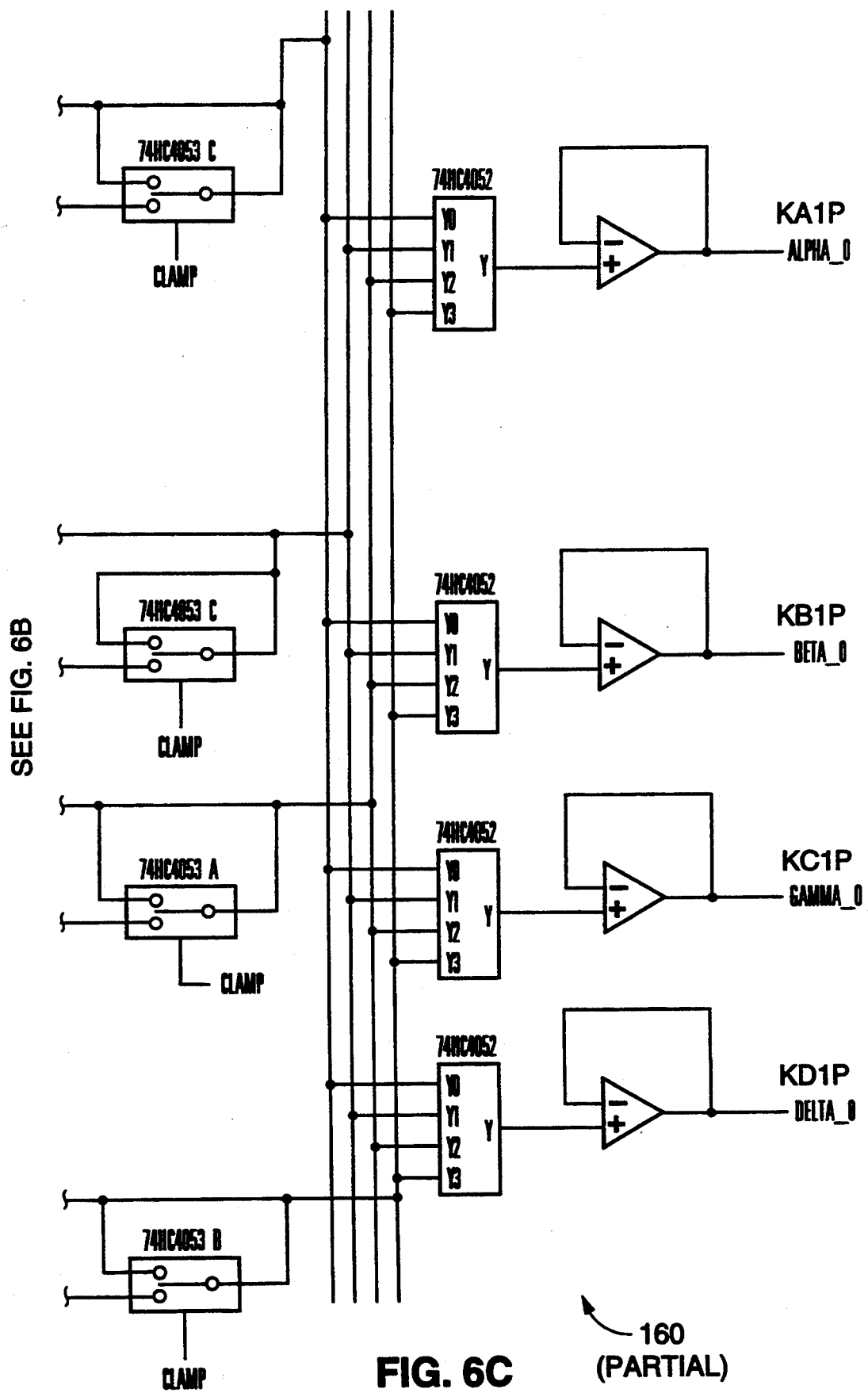
FIG. 6C 160 (PARTIAL)

VIDEO COMBINER

This is a continuation of application Ser. No. 07/685,225 filed on Apr. 12, 1991 now abandoned.

BACKGROUND OF THE INVENTION

1. Field of the Invention

The present invention relates to video signal combiners, and in particular, to analog video signal combiners.

2. Description of the Related Art

Video effects systems, including video effect generators and video combiners, are well known and widely used in the art. Generally, a video effects system receives at least two video input signals, with one selected for use as a video fill signal and the other selected for use as a video background signal. This selection involves another input signal, i.e. a key signal, which selectively keys the fill video over the background video. These video signals can then be processed in accordance with a number of well known video effects. For example, the fill video can be keyed onto the background video with perspective or rotational effects, or a video image can be constructed which appears to be a three-dimensional object with fill video occupying the faces of the object. While all of the foregoing, and much more, can be achieved with conventional video effects systems, many limitations have existed.

A problem with conventional video combiners involves the introduction of video highlights, such as gleams, to active video in real time. Conventional combiners require a complex key signal which must be defined in real time when seeking to introduce video highlights, or gleams, onto an output image which is being spatially transformed (e.g. rotated, given perspective or keyed into a three-dimensional image). This has required generation of a complex key signal.

Another problem with conventional video combiners involves layered keying of multiple video input signals. Conventional combiners have used layered keyers in which one keyed signal becomes the fill video signal for a subsequent keyer, and so on. This requires a great deal of hardware and complex circuit.

Another problem with conventional video combiners involves the establishing of fill video priority within a keyed output image. When multiple fill video images are combined on a single background and are simultaneously manipulated three-dimensionally, priority must be established to ensure that the "front" image remains in front and the "rear" image remains behind the front image. This priority must be dynamically adjusted in real time as the fill video images undergo their spatial (e.g. three-dimensional) transformations. Conventional systems, due to limited dynamic range for Z video information, often produce ragged or fuzzy image intersections during this Z data priority control.

SUMMARY OF THE INVENTION

A video signal combiner in accordance with the present invention provides means for generating a gleam key signal for keying a video image which has been selectively spatially transformed. Means are provided for generating a gleam key in accordance with dynamic planar description data representing the dynamic planar positioning of the gleam within the resultant video image, and for selectively altering the gleam profile or contrast range prior to its keying of the video image.

A video signal combiner in accordance with the present invention provides means for layering multiple key and video signals simultaneously in parallel. The multiple key and video signals are all layered simultaneously in an analog format, thereby minimizing video signal delays. The multiple key signals can be selectively prioritized relative to one another.

The present invention further provides a plurality of multiplier circuits for simultaneously layering multiple key and video signals in parallel, wherein all of the multiplier circuits share common output compensation circuits.

A video signal combiner in accordance with the present invention provides means for maintaining Z data priority control when combining multiple, spatially transformed fill video images on a single background. The present invention provides means for dynamically maintaining or adjusting Z data priority as the fill video images are spatially transformed. Dynamic range for internally generated the Z video data is maintained at the maximum range possible using normalized Z data.

These and other objectives, features and advantages of the present invention will be understood upon consideration of the following detailed description of the invention and the accompanying drawings.

DETAILED DESCRIPTION OF THE INVENTION

Throughout the following description, references to signal formats, frequencies and bandwidths reflect the use of a preferred embodiment of the present invention with video according to the NTSC video standard or component video suitable for encoding according to the NTSC standard. However, it should be understood that alternative embodiment of the present invention for systems operating according to other video standards, such as PAL or SECAM, can also be realized in accordance with the following discussion.

The present invention can be used in association with the apparatuses and methods disclosed in the following commonly assigned, copending patent applications: Ser. No. 07/677,382, entitled "An Improved Networked Modular Video Processing System" and filed by Beaulier et al. on Mar. 28, 1991; Ser. No. 07/677,383, entitled "A Video Processing System Having Improved Graphics Display And Performance" and filed by Beaulier on Mar. 28, 1991 Ser. No. 07/678,042, entitled "A Video Processing System With Improved Graphical Control And Real Time Interaction With External Devices" and filed by Bershtein et al. on Mar. 28, 1991; Ser. No. 07/678,041, entitled "A Video Processing System Having Improved Internal Switching Capability" and filed by Beaulier et al. on Mar. 28, 1991; Ser. No. 07/678,011, entitled "A Video Processing System Having Improved Transition Control And Display" and filed by Pelley on Mar. 28, 1991; Ser. No. 07/678,012, entitled "A Video Processing System Having Improved Interface With External Devices" and filed by Bershtein on Mar. 28, 1991; Ser. No. 07/677,381, entitled "A Video Processing System Having Improved Synchronization" and filed by Griffen on Mar. 28, 1991; Ser. No. 07/677,790, entitled "Digital Special Effects Video Generator With Three-Dimensional Image Generator" and filed by Wolf and Rolhfs on Mar. 29, 1991; Ser. No. 07/685,826, entitled "Improved Digital Video Effects Generator" and filed by Woodham on Apr. 12, 1991; Ser. No. 07/685,825, entitled "Improved Digital Video Effects Generator" and filed by Wolf and Kulmaczewski on Apr. 12, 1991; and Ser. No. 07/684,591, entitled "Video Sample Rate Converter" and filed by Andrews, Antonio and Bennett on Apr. 12, 1991. The specifications of the foregoing patent applications are incorporated herein by reference.

Figure 1:
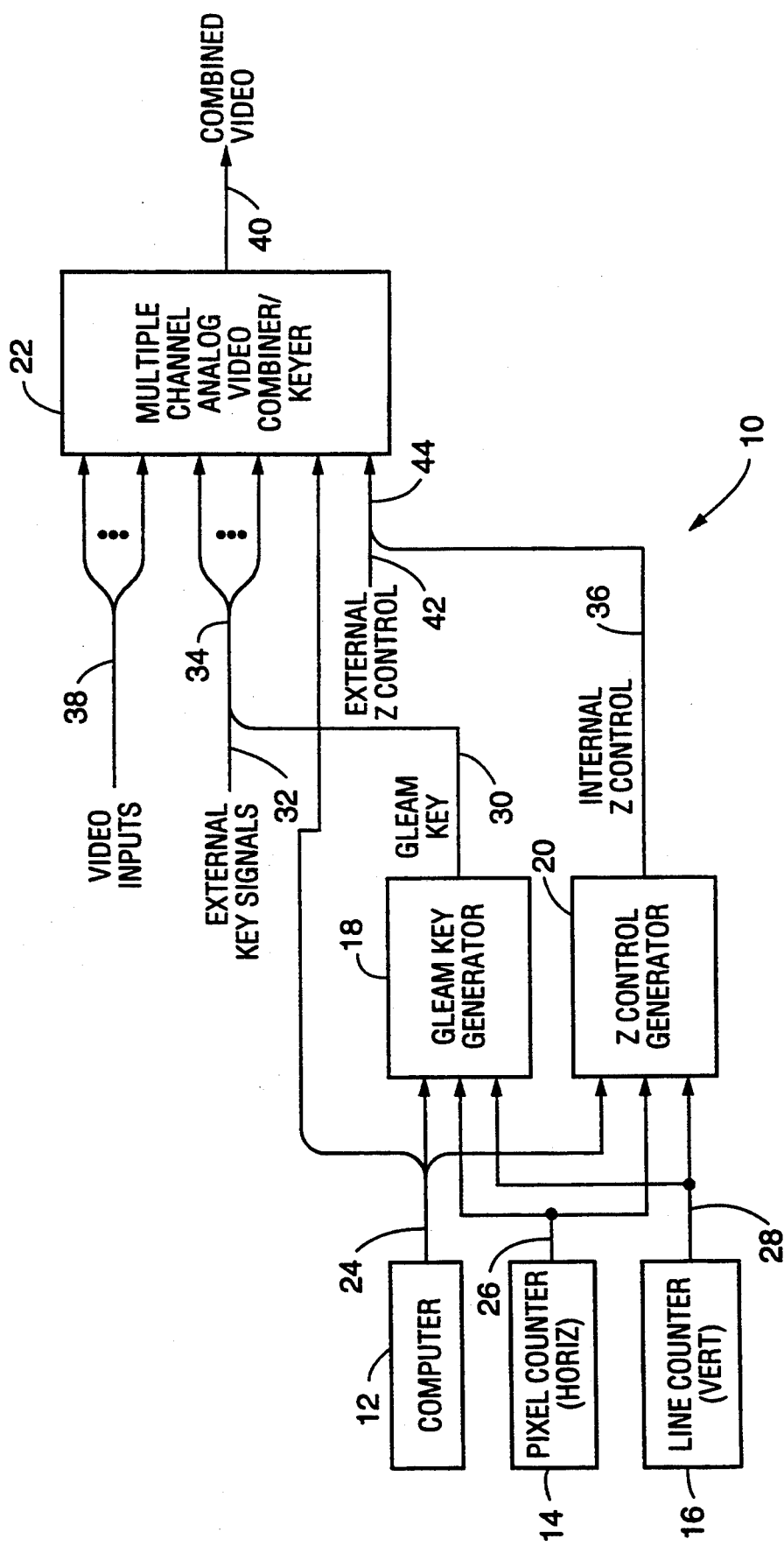
FIG. 1 is a functional block diagram of a video combiner system in accordance with the present invention.

Referring to FIG. 1, a video combiner system in accordance with the present invention includes a computer 12, a pixel counter 14, a line counter 16, a gleam key generator 18, a Z control generator 20 and a multiple channel analog video combiner/keyer 22, substantially as shown. The computer 12 provides a plurality of control data 24 for the gleam key generator 18, Z control generator 20 and multiple channel analog video combiner/keyer 22. The pixel counter 14 supplies a pixel count clock signal 26 at the pixel rate. The line counter 16 supplies a line count clock signal 28 at the horizontal rate.

The gleam key generator 18 provides a gleam key signal 30 which, combined with a plurality of external key signals 32 is one of a plurality 34 of key signals supplied to the multiple channel analog video combiner/keyer 22. The Z control generator 20 provides an internal Z control data signal 36 to the multiple channel analog video combiner/keyer 22. The multiple channel analog video combiner/keyer 22 further receives an external Z control data signal 42 (as part of its Z control input 44), and a plurality 38 of video input signals and outputs a combined video signal 40.

Figure 2:
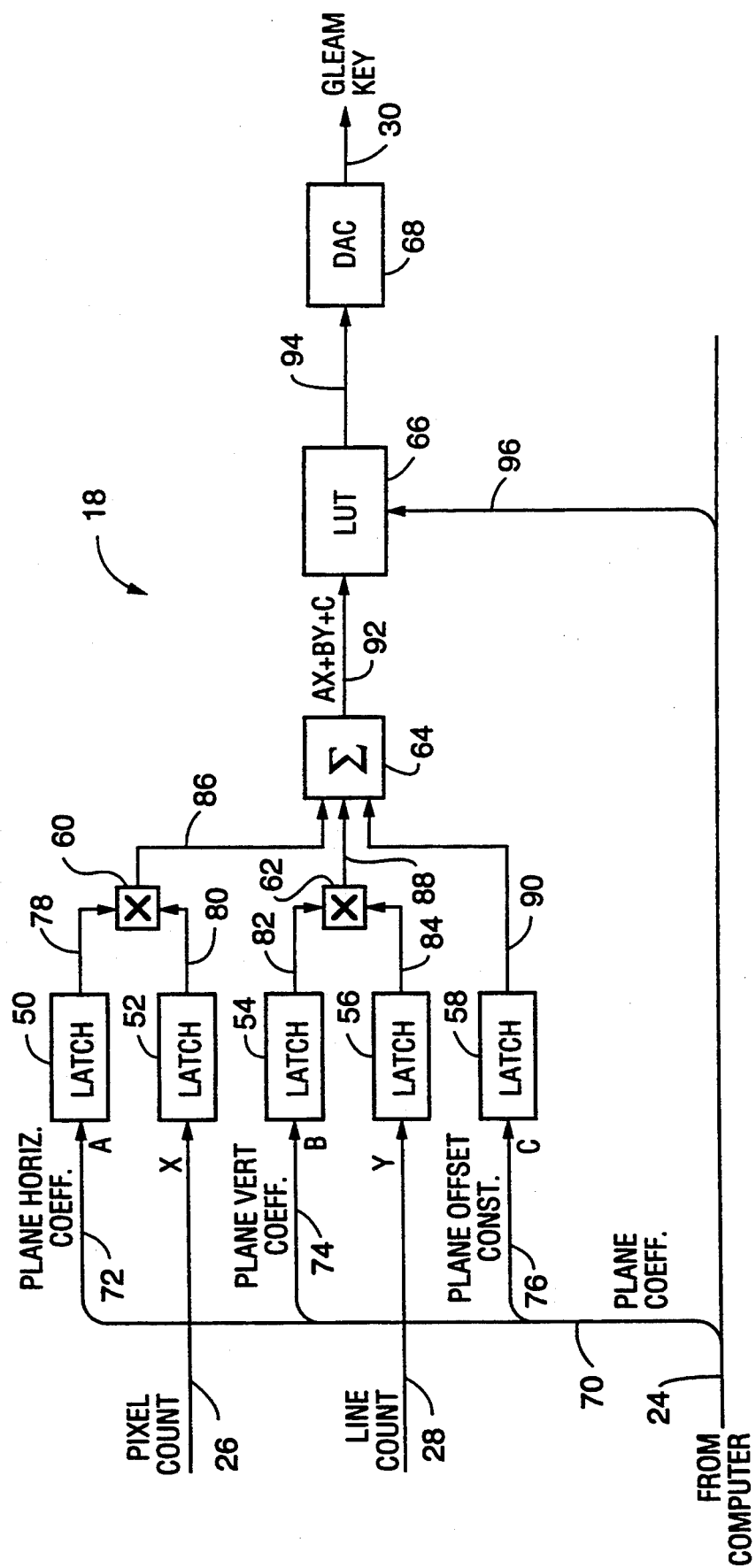
FIG. 2 is a functional block diagram of the gleam key generator of FIG. 1.

Referring to FIG. 2, the gleam key generator 18 includes a plurality of latches 50, 52, 54, 56, 58, two data multipliers 60, 62, a data adder 64, a look-up table ("LUT") 66 and a digital-to-analog converter ("DAC") 68, substantially as shown.

Video image plane coefficient data 70 is received from the computer 12, with plane horizontal coefficient data 72 being latched by a latch 50, plane vertical coefficient data 74 being latched by a latch 54, and plane offset constant data 76 being latched by a latch 58. The horizontal coefficients A (represented by the plane horizontal coefficient data 72), the vertical coefficients B (represented by the plane vertical coefficients data 74) and the offset constants C (represented by the plane offset constants data 76), in conjunction with the horizontal location X (represented by the pixel count 26) and the vertical location Y (represented by the line count 28) define the plane of the video image in accordance with the linear plane formula $AX+BY+C$.

The latched horizontal coefficients 78 and pixel count 80 are multiplied in the first multiplier 60. The latched vertical coefficients 82 and line counts 84 are multiplied in the second data multiplier 62. These products 86, 88 are summed with the latched offset constants 90 in the adder 64 to produce a signal 92 representing the linear plane formula $AX+BY+C$. This signal 92 is used to address the LUT 66. The output 94 of the LUT 66 is converted to an analog gleam key signal 30 by the DAC 68.

The contents of the LUT 66, and therefore the gleam key signal 30, can be selectively altered according to control data 96 from the computer 12. For example, by selectively altering the contents of the LUT 66, the gleam profile can be selectively altered, e.g. the gleam key signal 30 can be selectively generated to produce straight, shaped, bright, dull, sharp or subtle gleams in the final output video image.

Figure 3:
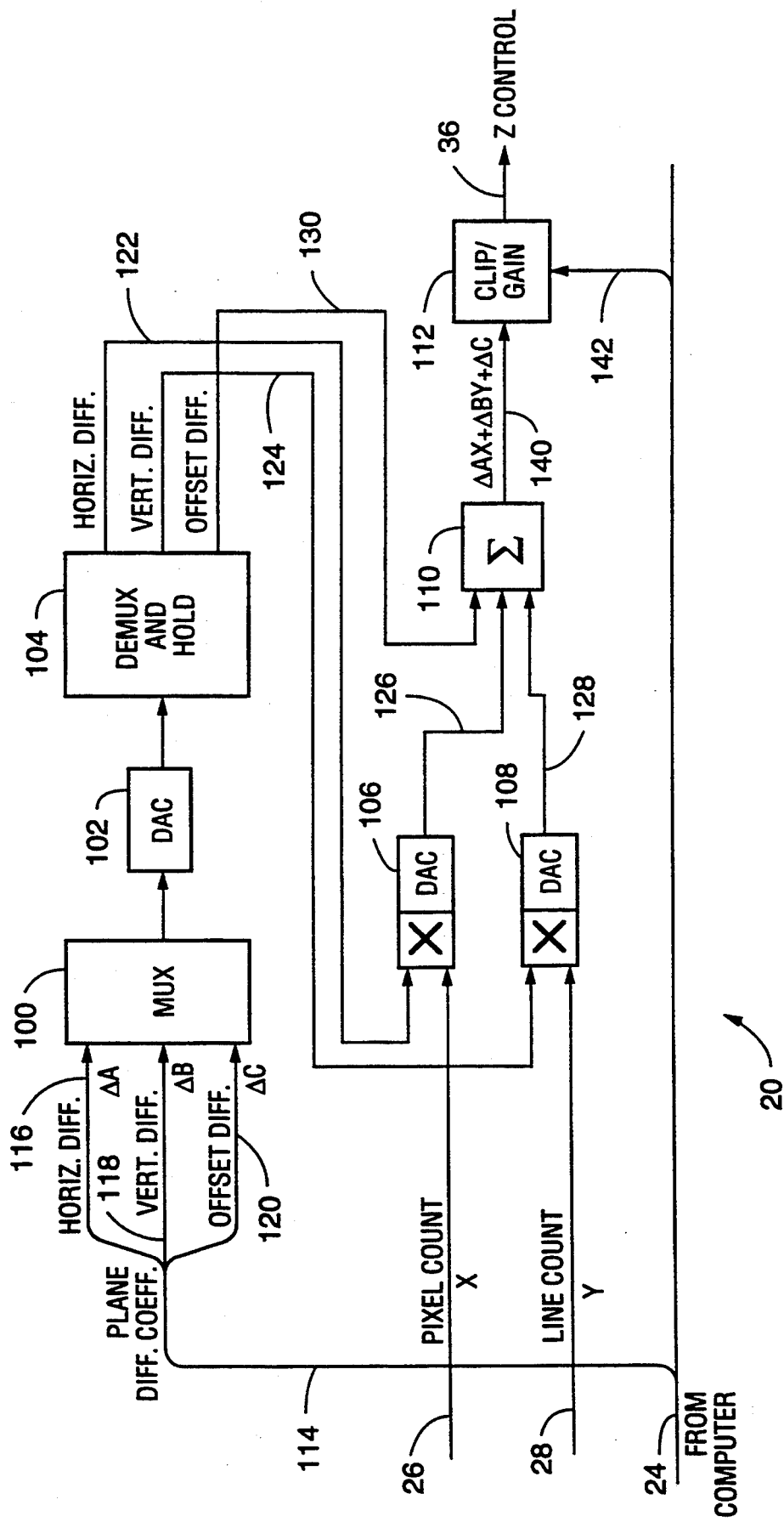
FIG. 3 is a functional block diagram of the Z control generator of FIG. 1.
Figure 5A:
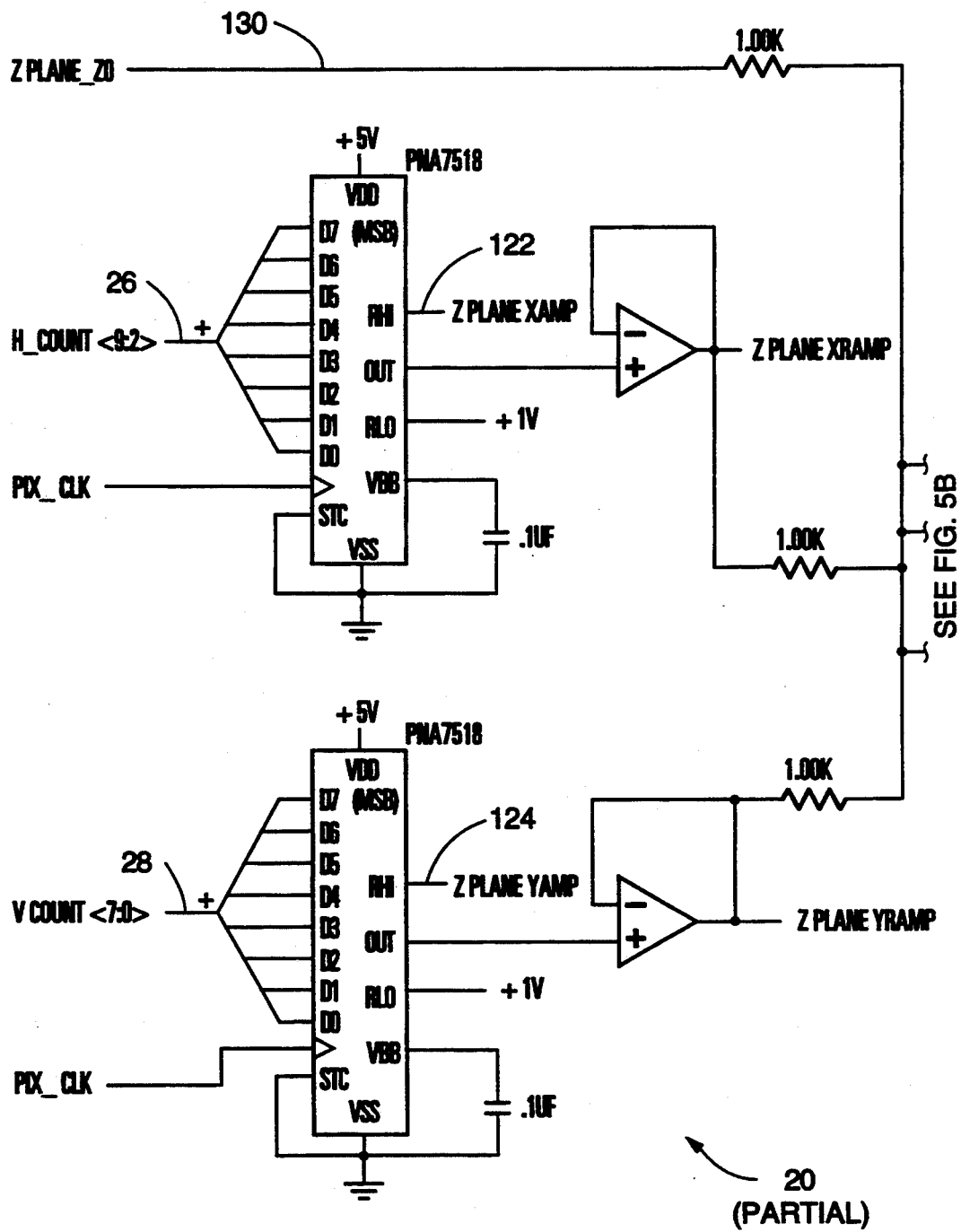
FIG. 5 is a partial schematic diagram of the Z control generator of FIG. 3.
Figure 5B:
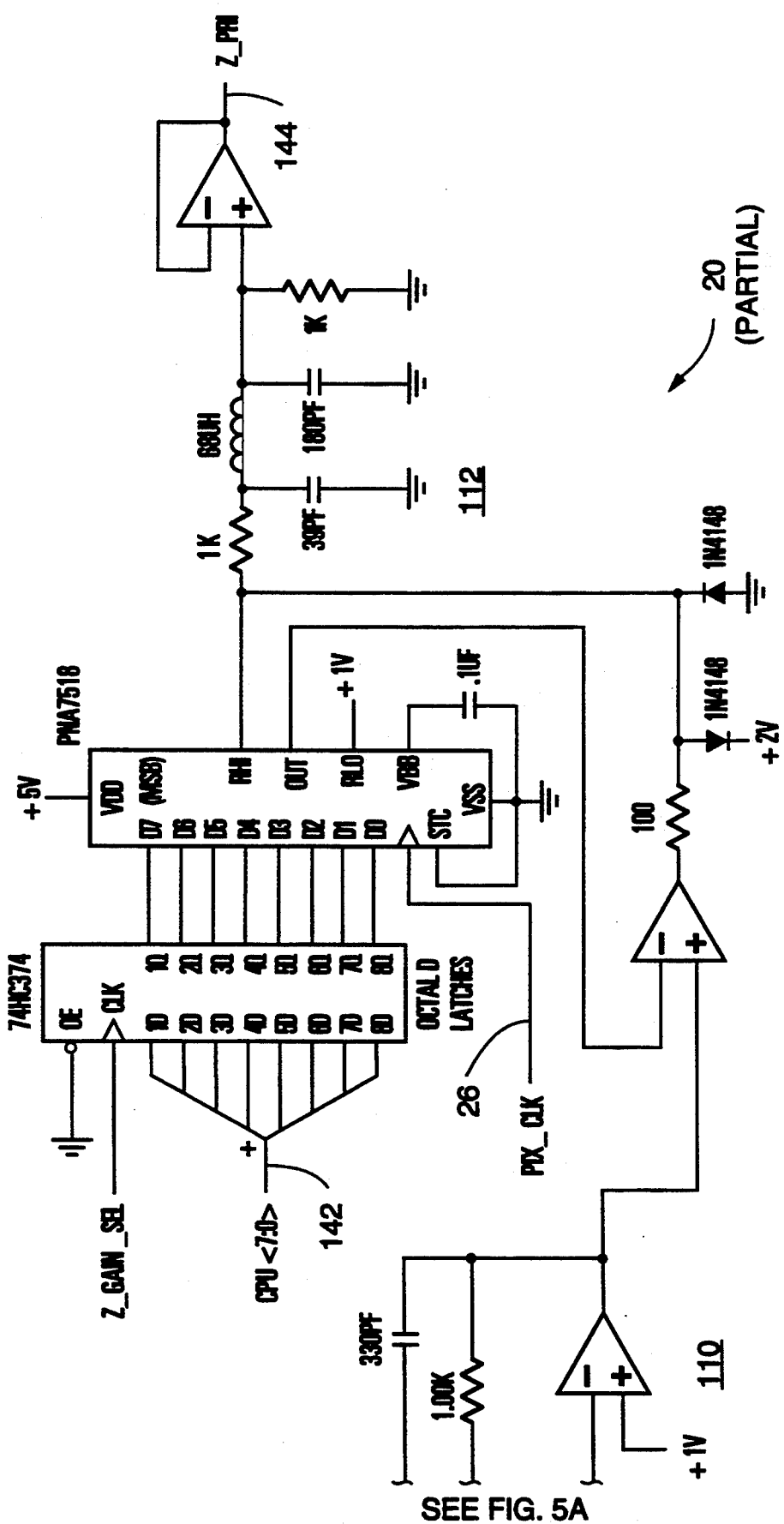
Figure 6A:
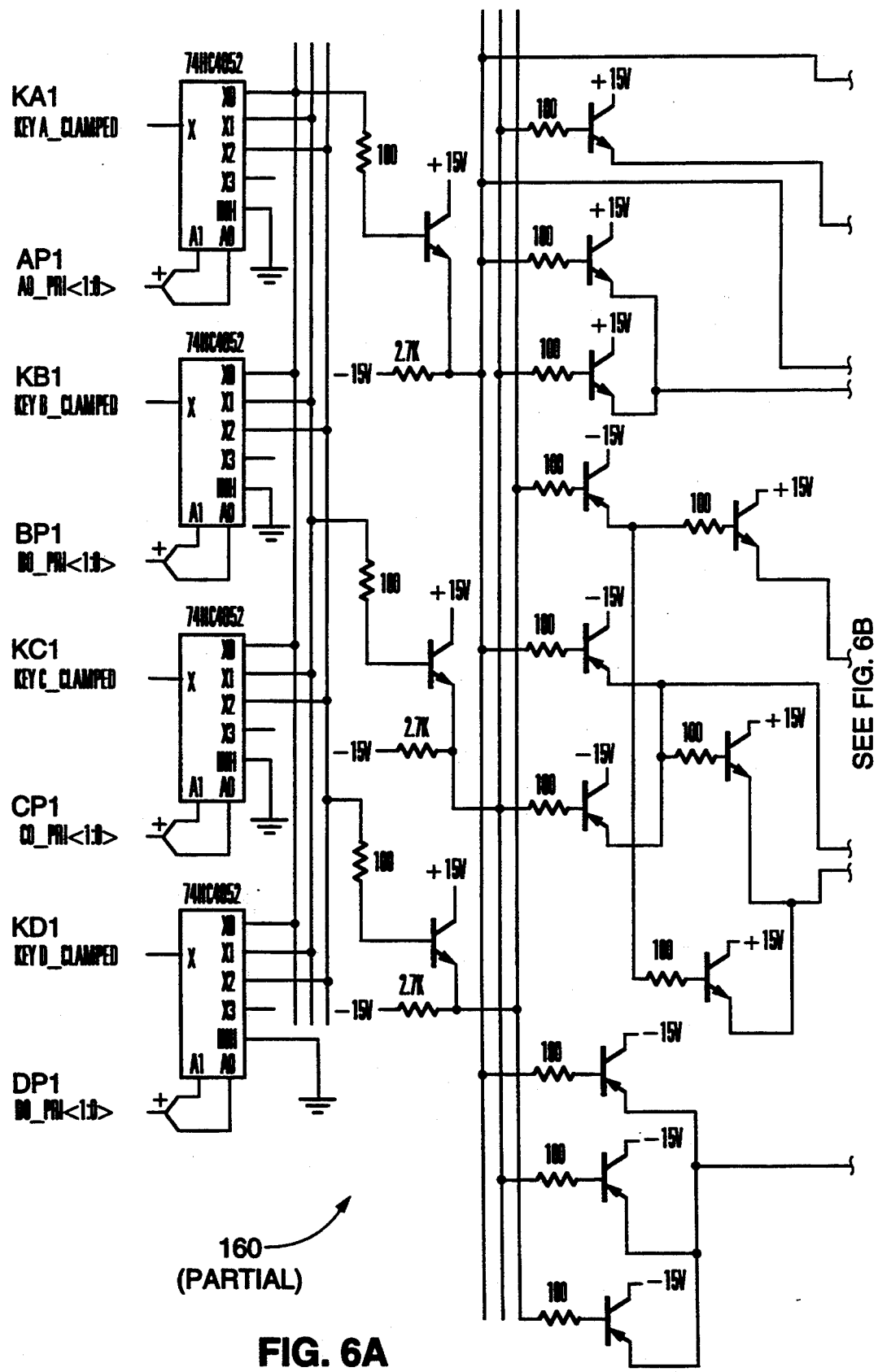
FIG. 6 is a schematic diagram of a key processor of FIG. 4.
Figure 7A:
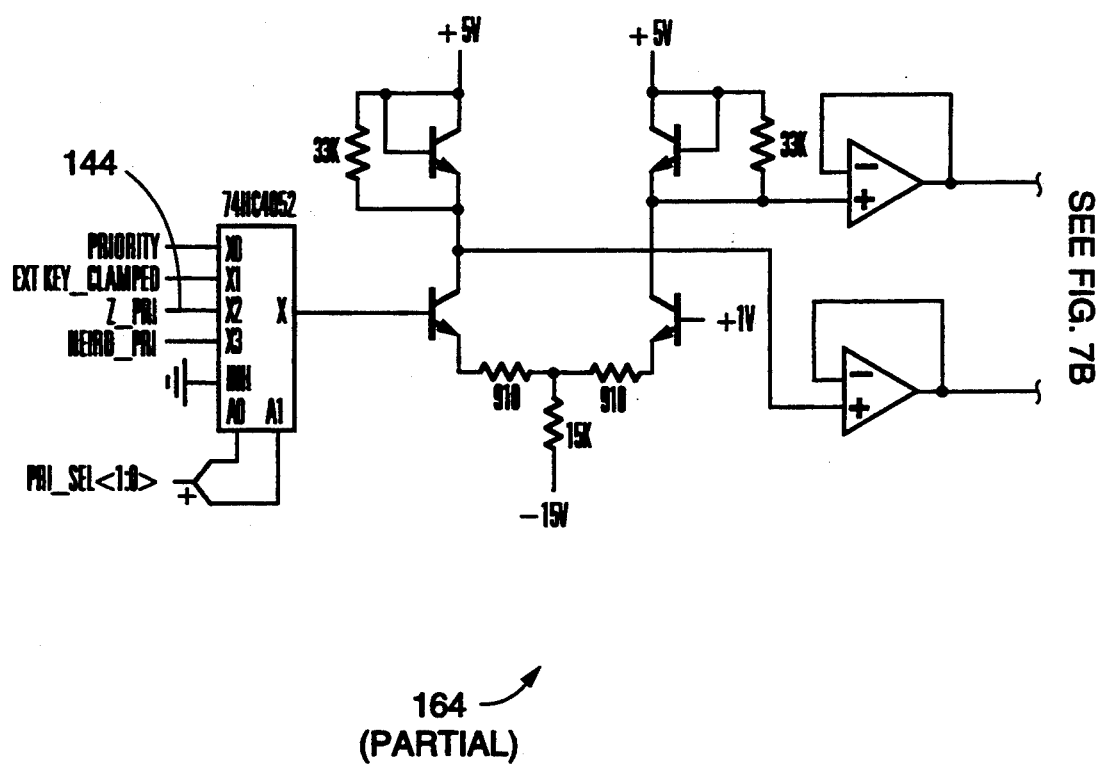
FIG. 7 is a schematic diagram of the cross faders of FIG. 4.
Figure 7B:
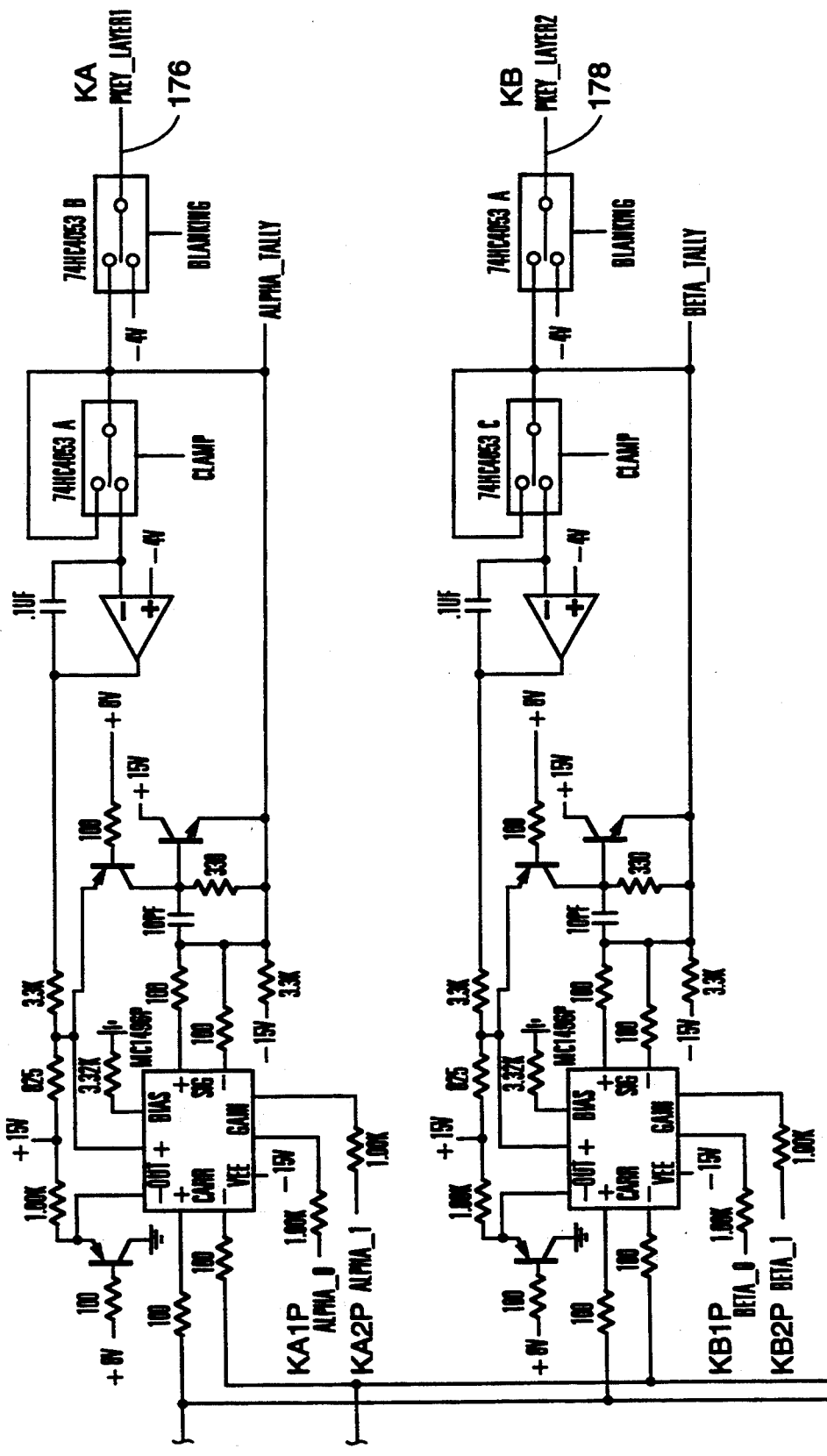
Figure 7C:
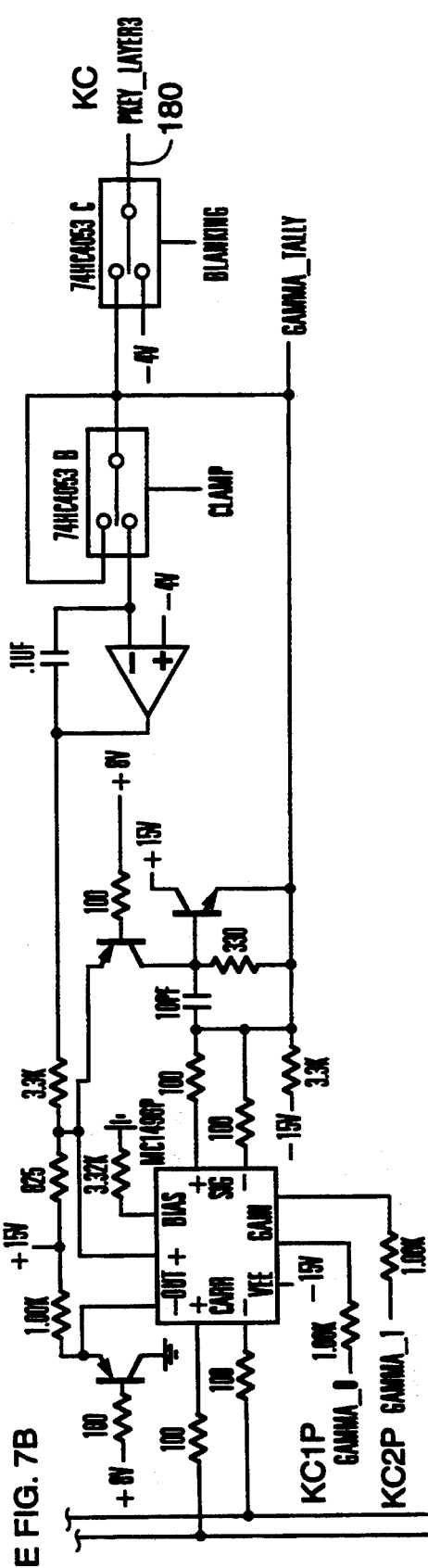
Figure 7C:
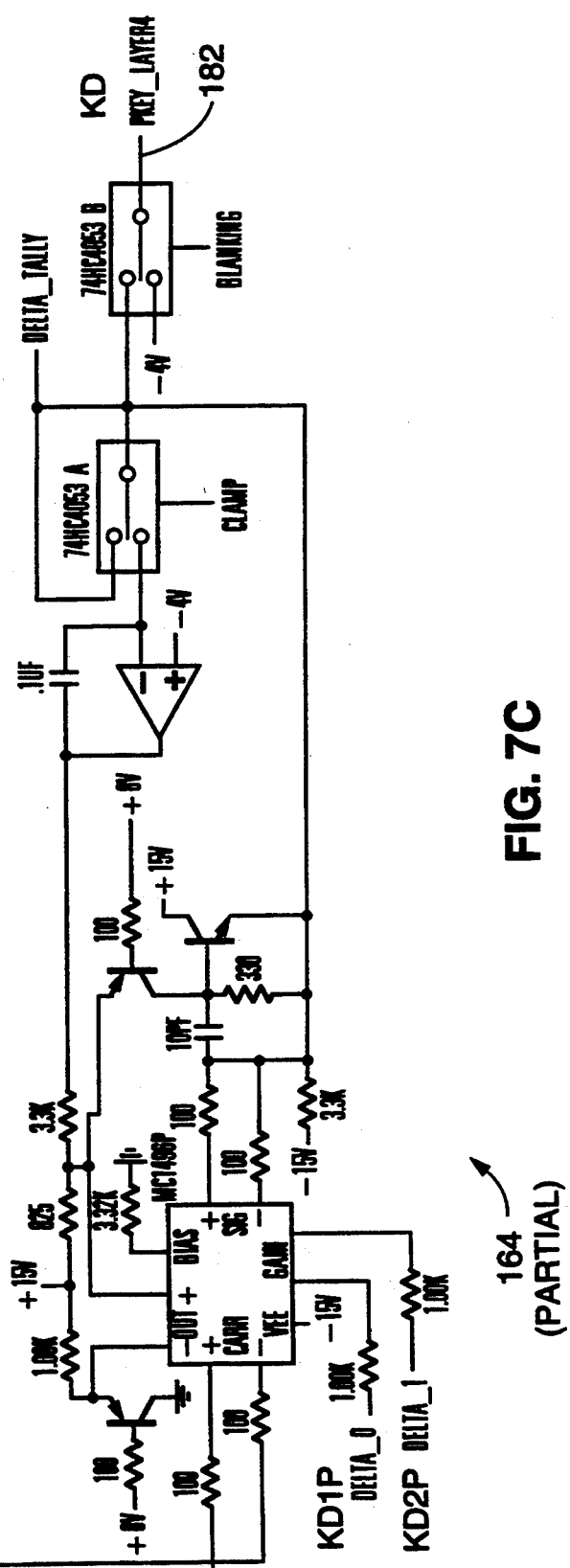

Referring to FIG. 3, a Z control generator 20 in accordance with the present invention includes the following components, substantially as shown: a multiplexer 100; a DAC 102; a demultiplexer and hold 104; two multiplying DACs 106, 108; an adder 110; and a clip/gain processor 112. A partial schematic diagram of a preferred embodiment of the Z control generator 20 is illustrated in FIG. 5.

Video image plane differential coefficients 114 are received from the computer 12. The plane differential coefficient data 114 represents the differences between the respective video image planes horizontal coefficients, vertical coefficients and offset constants. In other words, corresponding horizontal and vertical coefficients and offset constants for two video image planes are subtracted, i.e. one from the other, to produce horizontal differential coefficients $\Delta A$ (represented by horizontal differential data 116), vertical differential coefficients $\Delta B$ (represented by vertical differential data 118) and offset differential constants $\Delta C$ (represented by offset differential data 120). These coordinate differential signals 116, 118, 120 are multiplexed by the multiplexer 100, converted to analog signals by the DAC 102, and demultiplexed and held (e.g. via charge storage by capacitors) by the demultiplexer and hold 104 for a time duration equivalent to one video field, e.g. 1/60 second for NTSC compatible video.

The analog horizontal differential signal 122 is multiplied with the digital pixel count clock 26 in a multiplying DAC 106. The analog vertical differential signal 124 is multiplied by the line count clock 28 in a multiplying DAC 108. These analog product signals 126, 128 are summed with the analog offset differential signal 130 in the adder 110 to produce an analog signal 140 representing the planar expression $\Delta AX+\Delta BY+\Delta C$.

This signal 140 is processed by the clip/gain processor 112 (e.g. a variable gain circuit with clipping) according to control data 142 received from the computer 12. The resulting output signal 36 represents Z control data used by a plurality of cross faders in the multiple channel analog video combiner/keyer 22 (discussed more fully below).

In accordance with the computer program listed further below, the computer 12 provides plane differential coefficients 114 to the internal Z control generator 20 having values such that, over the full range of the pixel 26 and line 28 counts, full excursion of the cross faders control signal 144 (FIG. 4) is maintained. In other words, when the internally generated Z control data signal 36 is selected for the cross faders control signal 144, the plane differential coefficients 114 from the computer 12 have ranges of values to maximize the dynamic range of the internally generated Z control data signal 36. This dynamic range of the Z control data signal 36 is modified in accordance with the clip/gain control data 142 from the computer which appropriately scales (e.g. via gain control and clipping for desired video image size) the planar signal 140 (discussed above). Where, in accordance with the image plane information available in the computer 12, no planar intersection takes place, the Z control data signal 36 is constant. However, where planar intersection is to take place, the Z control data 36 is normalized to maintain the aforementioned maximum dynamic range.

Figure 4:
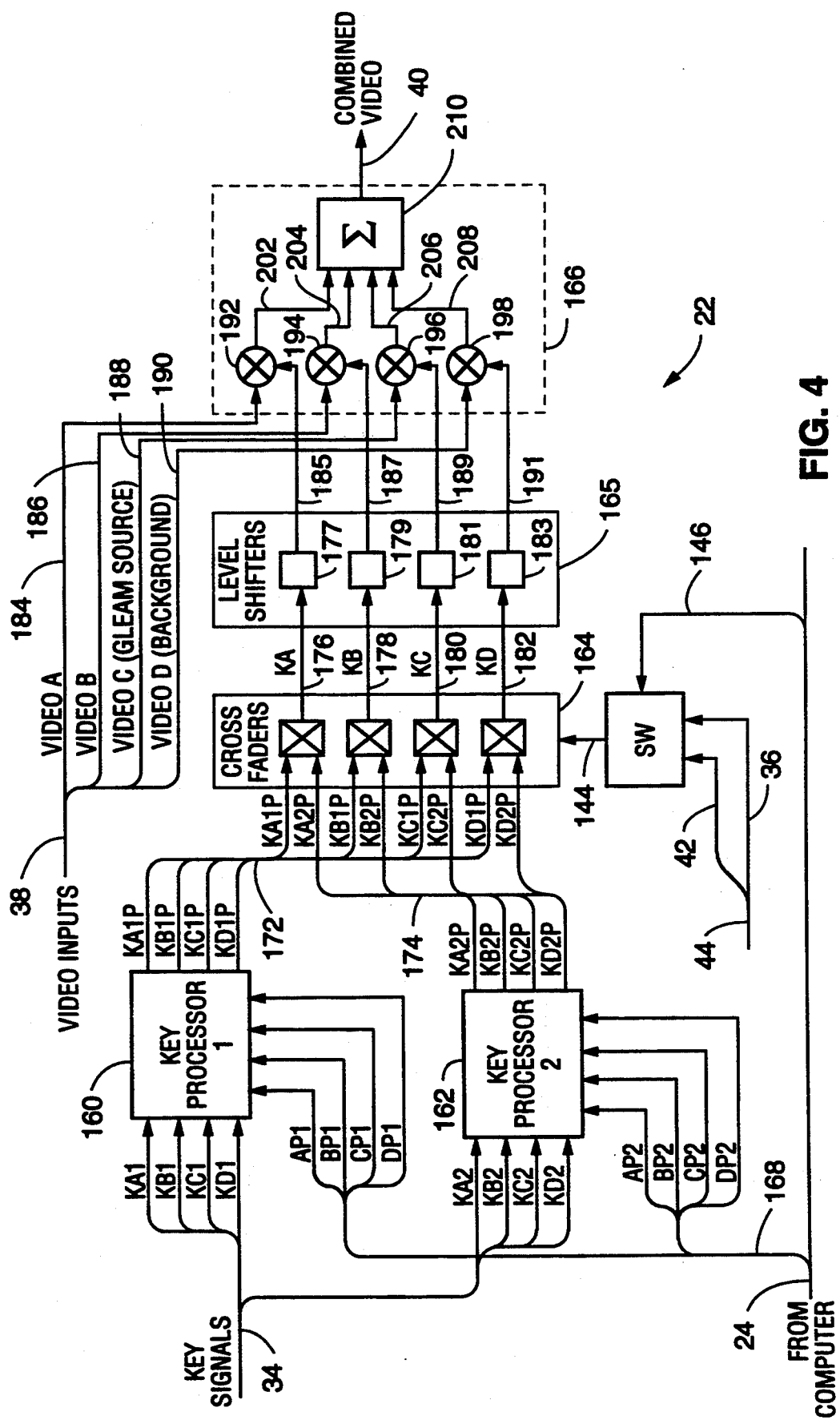
FIG. 4 is a functional block diagram of the multiple channel analog video combiner/keyer of FIG. 1.

Referring to FIG. 4, a multiple channel analog video combiner/keyer 22 in accordance with the present invention includes two key processors 160, 162, a plurality 164 of cross faders, a plurality 165 of level shifters and a four channel analog signal multiplier 166, substantially as shown. Schematic diagrams of preferred embodiments of a key processor 160, a plurality 164 of cross faders, a plurality 165 of level shifters and a four channel analog signal multiplier 166 are illustrated in FIGS. 6 through 9, respectively.

The key processors 160, 162 selectively prioritize the input key signals 34 according to priority data 168 received from the computer 12. The corresponding priority processed key signals 172, 174 are cross-faded in accordance with Z control data 144 (selected from the internal 36 or external 42 Z control data in accordance with control data 146 from the computer 12) to produce four analog priority processed key signals 176, 178, 180, 182. These priority processed key signals 176, 178, 180, 182 are logarithmically level shifted by their respective logarithmic level shifters 177, 179, 181, 183.

The resulting level-shifted signals 185, 187, 189, 191 are multiplied with corresponding input analog video signals 184, 186, 188, 190 within their respective analog signal multipliers 192, 194, 196, 198 (discussed further below). The resulting product signals 202, 204, 206, 208 are summed within the adder 210 to produce the combined video output signal 40.

Figure 8A:
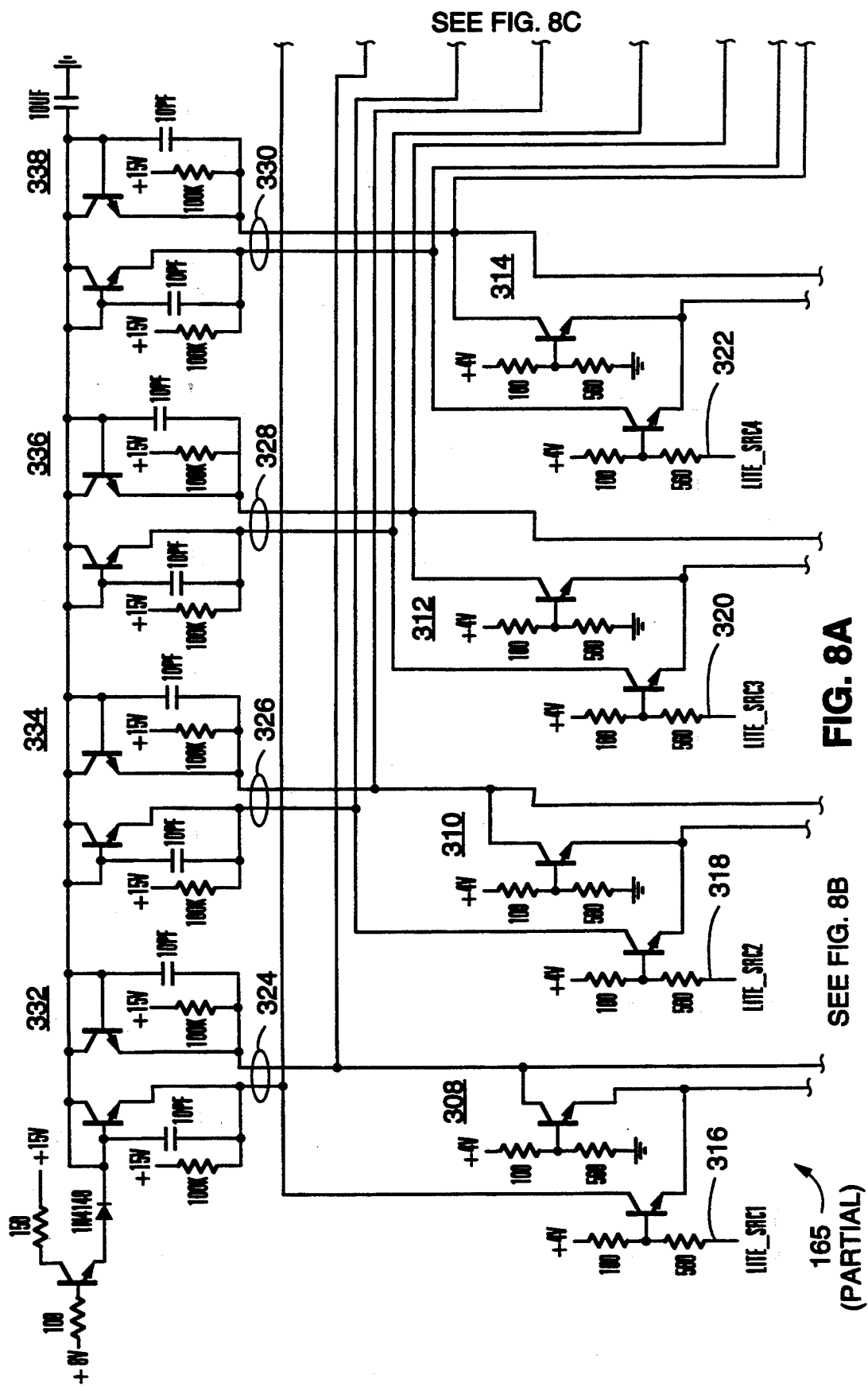
FIG. 8 is a schematic diagram of the logarithmic level shifters of FIG. 4.
Figure 8B:
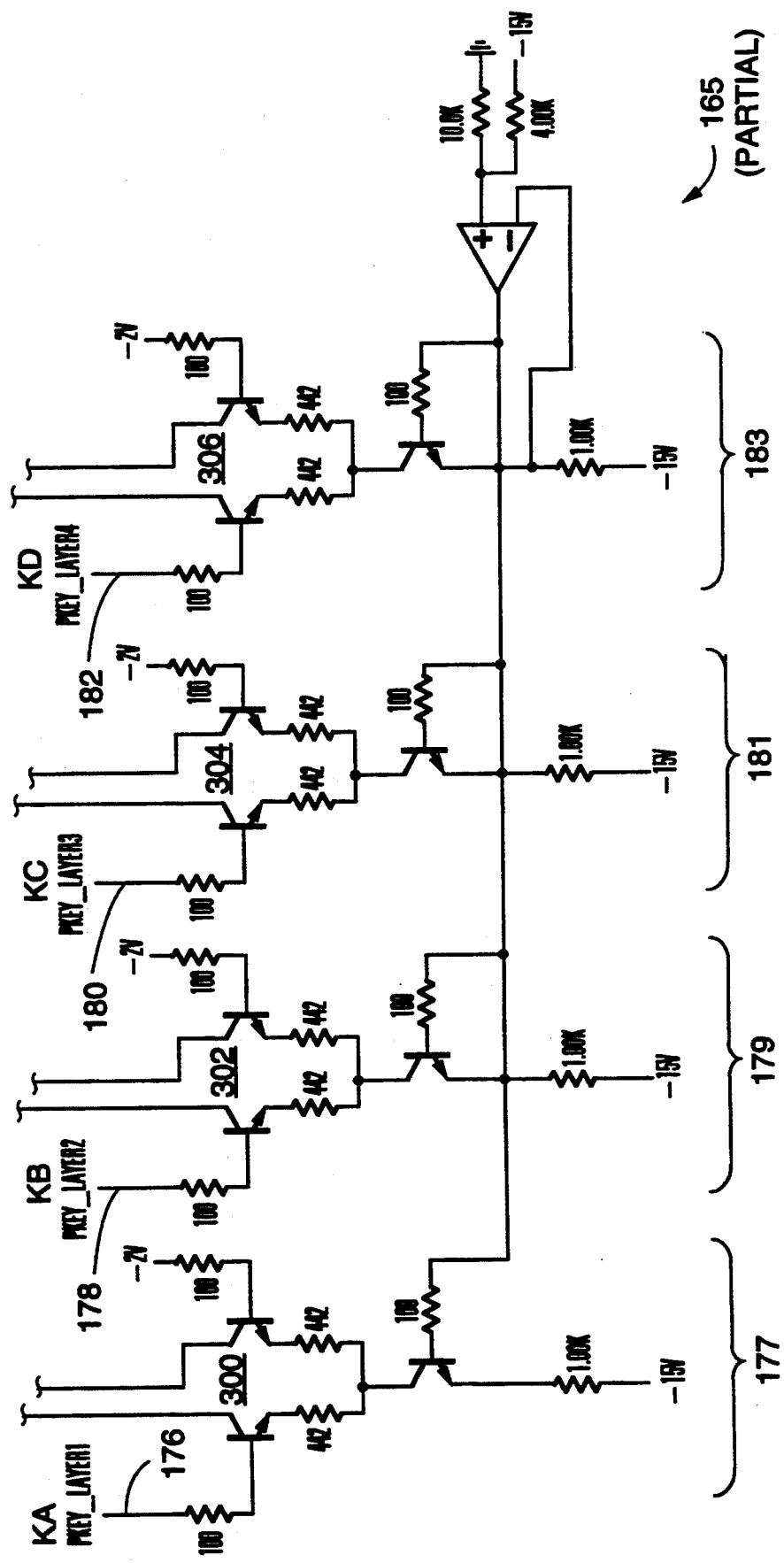
Figure 8C:
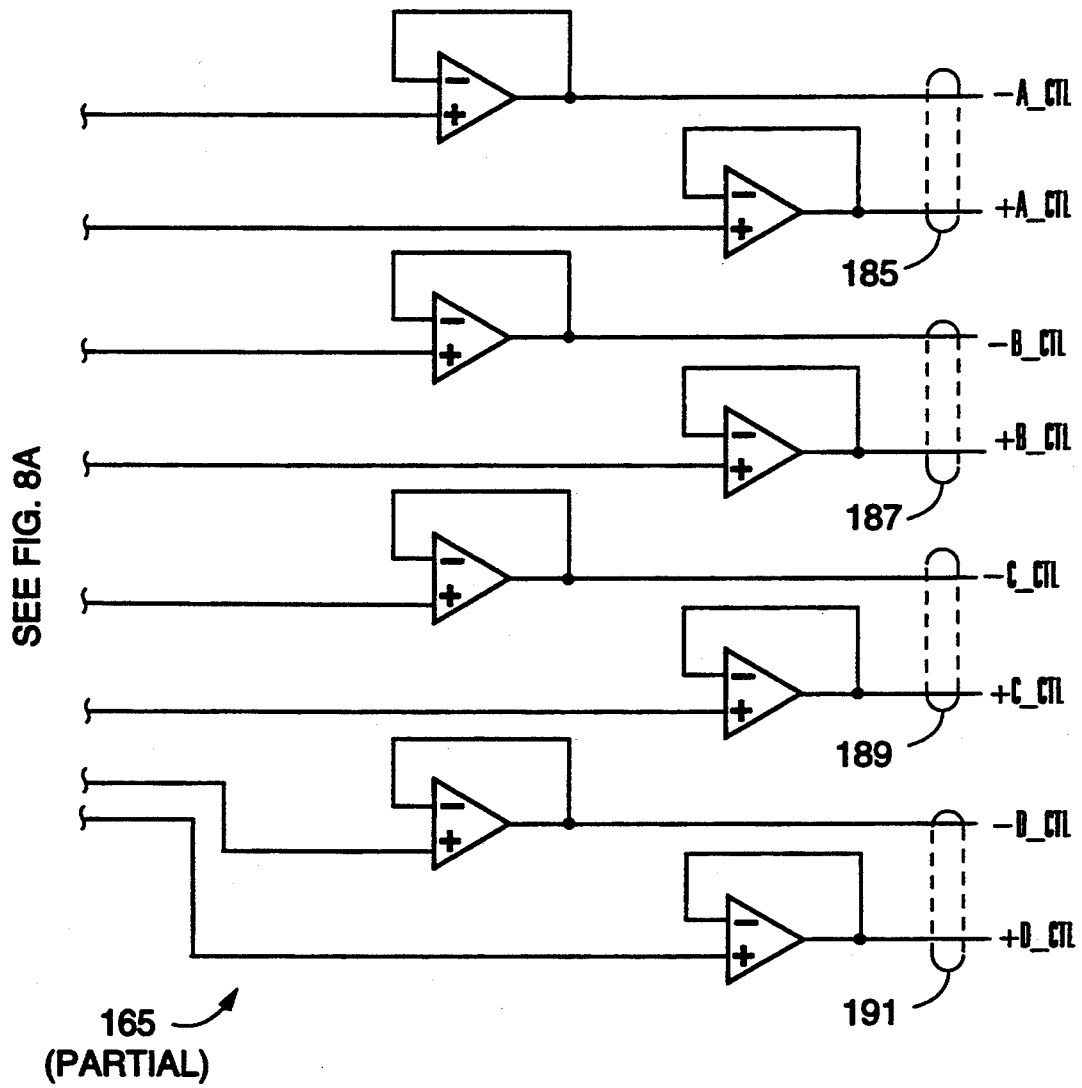

Referring to FIG. 8, the operation of the plurality 165 of logarithmic level shifters can be better understood. The four analog priority processed key signals 176, 178, 180, 182 are inputted to differential amplifiers 300, 302, 304, 306, which form the input stages of the level shifters 177, 179, 181, 183. Within the output branches of these input differential amplifiers 300, 302, 304, 306 are current diversion circuits 308, 310, 312, 314 for selectively unbalancing the output signals of the differential amplifiers 300, 302, 304, 306, in accordance with contrast alteration signals 316, 318, 320, 322. These contrast alteration signals 316, 318, 320, 322, originating from light source signal (e.g. circles, ellipses, wipes) generators (not shown), are analog voltages which can selectively alter the contrast range of the level shifted key signals 185, 187, 189, 191.

The differential and selectively unbalanced key signals 324, 326, 328, 330 are logarithmically level shifted by their respective logarithmic level shifting circuits 332, 334, 336, 338. After passing through voltage-follower buffer amplifiers, these signals 324, 326, 328, 330 become the level-shifted (differential) key signals 185, 187, 189, 191 for multiplying within the four channel analog signal multiplier 166.

Figure 9A:
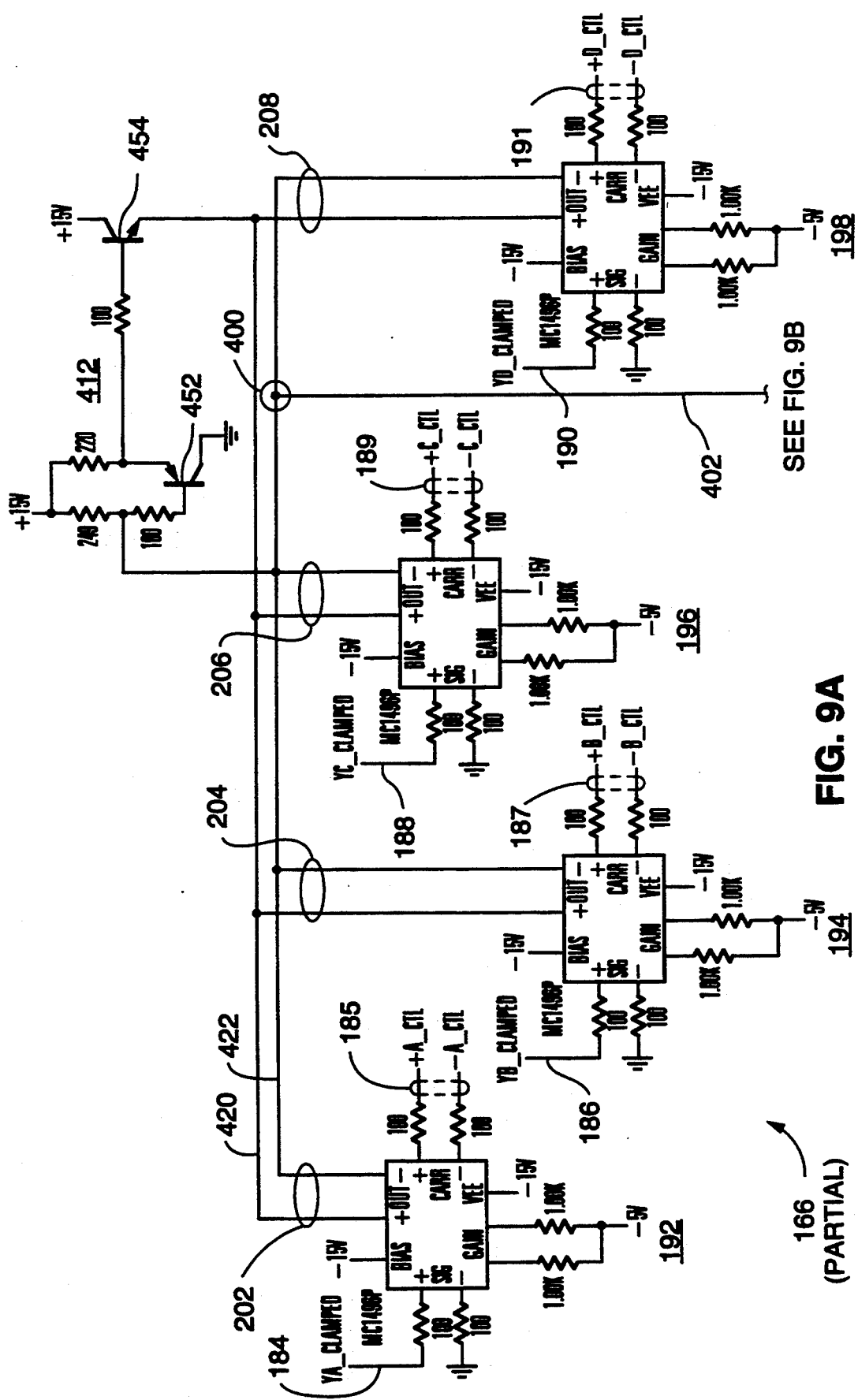
FIG. 9 is a schematic diagram of the four channel analog signal multiplier of FIG. 4.
Figure 9B:
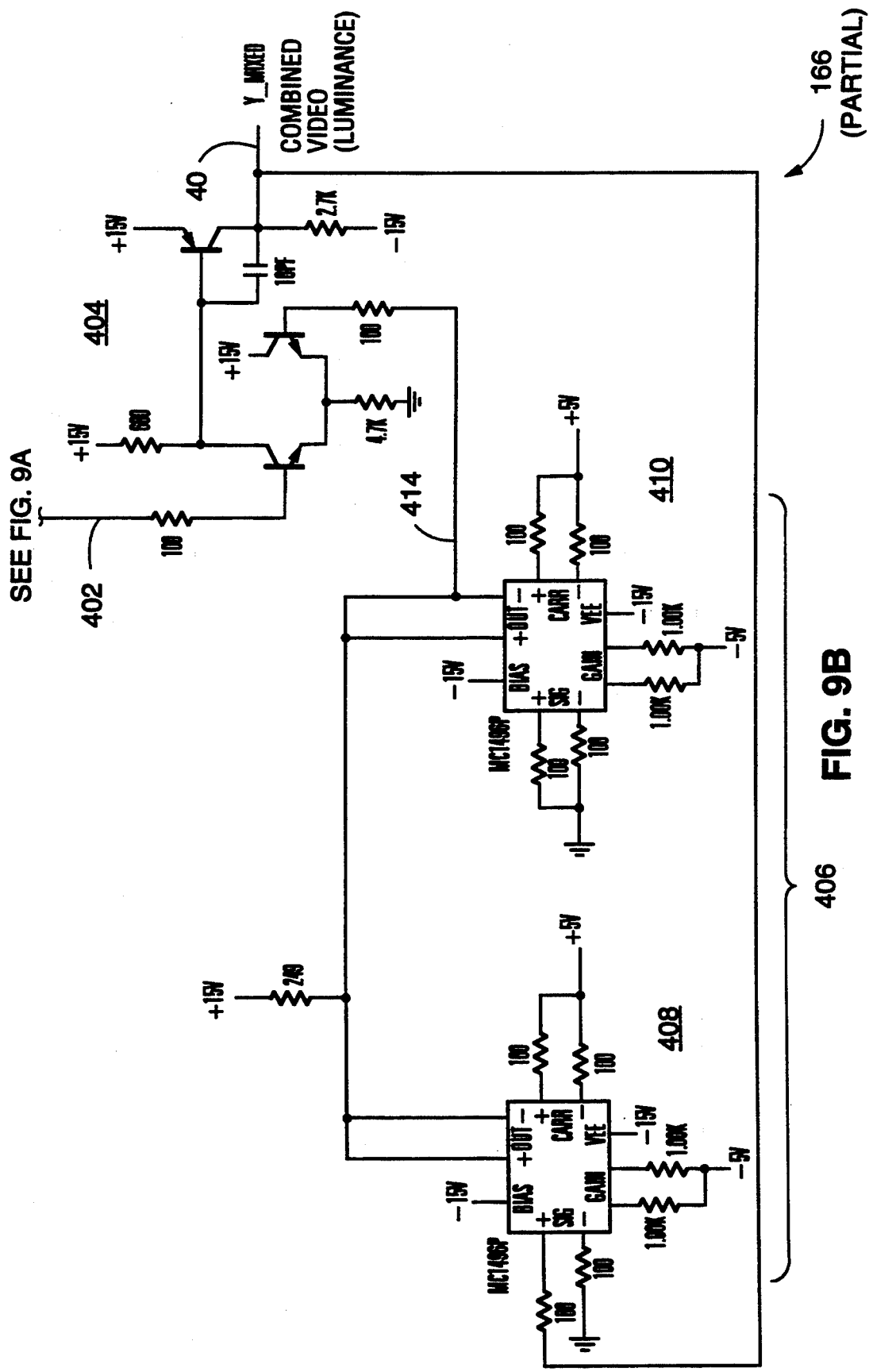

Referring to FIG. 9, the operation of a preferred embodiment of the four channel analog signal multiplier 166 can be better understood. The analog video signals 184, 186, 188, 190 are inputted to their respective multiplier circuits 192, 194, 196, 198, and multiplied therein by their corresponding level-shifted key signals 185, 187, 189, 191. The resulting (differential) product signals 202, 204, 206, 208, comprising electrical currents, are summed at a node 400 (which constitutes the adder 210 as seen in FIG. 4).

As seen in FIG. 9, the individual multiplier circuits 192, 194, 196, 198 are constructed around the use of an integrated balanced modulator/demodulator circuit manufactured by Motorola Semiconductor Corporation, having Part No. MC1496.

The resulting current sum 402 is buffered by an amplifier 404 prior to becoming the final combined video output signal 40. It should be understood that the circuit illustrated in FIG. 9 represents the plurality 166 of multipliers for multiplying the luminance components of the input video signals 184, 186, 188, 190. A similar circuit is used for multiplying the chrominance components.

The output buffer amplifier 404 has a feedback circuit 406 comprising two stages 408, 410 (similar to the multiplier stages 192, 194, 196, 198), which are biased to compensate the video signal multiplier stages 192, 194, 196, 198. The feedback circuit 406 faithfully reproduces any video data signal errors introduced within the outputs of the multiplier stages 192, 194, 196, 198. Such reproduced errors, represented by the feedback signal 414, cancel out first order errors within the multipliers' output signal 402 within the output (differential) buffer amplifier 404.

Figure 10:
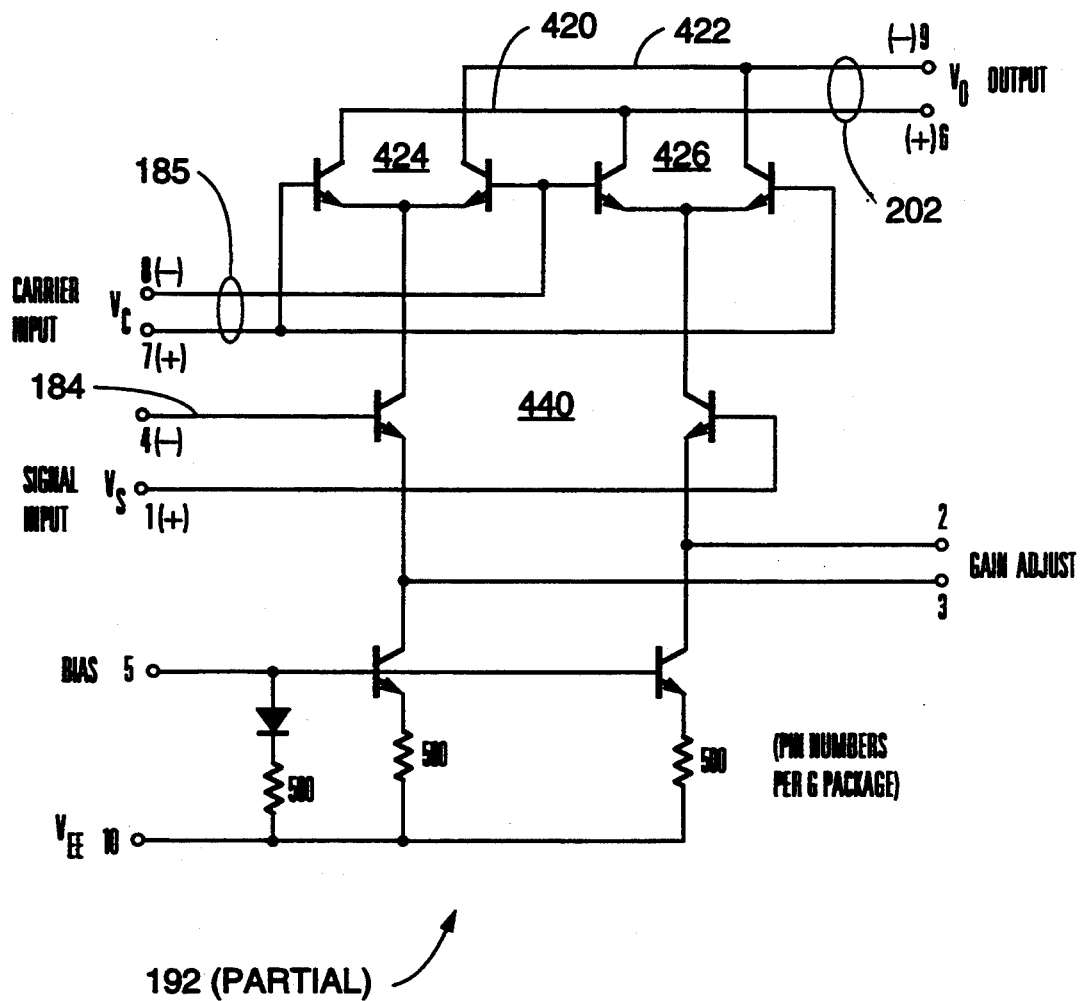
FIG. 10 is a schematic diagram of one of the multiplier stages of FIG. 9.

The feedback circuit 406 performs this compensation by generating equivalent errors within its output signal 414. How this is accomplished can be understood by referring to FIG. 10. FIG. 10 illustrates a partial schematic of the first multiplier stage 192, with the outer passive components (e.g. resistors) deleted for clarity. It should be understood that the schematic diagram of FIG. 10 represents the active circuit block for each of the multiplier stages 192, 194, 196, 198 and the feedback circuit stages 408, 410.

The output lines 420, 422 of the multiplier 192 (which are shared output lines for the other multiplier stages 194, 196, 198) receive their respective output signals from the collectors of two pairs 424, 426 of output transistors. With four multiplier stages 192, 194, 196, 198 providing output signals to these common output lines 420, 422, each output line 420, 422 has eight transistor collectors' outputs contributing to its respective signal.

The output signal 414 of the feedback circuit 406 also has eight transistor collectors' outputs contributing to its signal, since all output lines of both stages 408, 410 of the feedback circuit 406 are coupled together, as seen in FIG. 9. Therefore, first order errors introduced by the eight transistors feeding the output lines 420, 422 of the four multiplier stages 192, 194, 196, 198 will be reproduced by the eight transistors of the stages 408, 410 of the feedback circuit 406. Errors introduced by the stages 408, 410 of the feedback circuit 406 will be similar to those of the outputs of the four multiplier stages 192, 194, 196, 198 since the feedback circuit stages 408, 410 have their inputs biased in such a way as to maintain consistent current flow within each branch of the transistor circuits 440 comprising the feedback circuit stages 408, 410.

Further compensation is provided for the multiplier stages 192, 194, 196, 198 by the discreet circuit 412 coupled across their output lines 420, 422, as seen in FIG. 9. The transistors 452, 454, of the discreet circuit 412 are coupled as a complementary emitter follower. This causes the absolute DC voltage levels on the output lines 420, 422 to be equalized. In turn, this equalizes the $V_{BC}$ (DC voltage across base-collector junction) dependent parameters (e.g. output capacitances due to the Miller effect) within the output transistors 424, 426 (FIG. 10) of the multiplier stages 192, 194, 196, 198. This results in minimal differential shifts in any multiplier characteristics, such as signal phase differentials among the output signals 202, 204, 206, 208 of the multiplier circuits 192, 194, 196, 198.

The computer program listing below contains copyrighted material, copyright 1991, Abekas Video Systems, Inc. The copyright owner has no objection to the reproduction by anyone of the patent document or the patent disclosure, as it appears in the Patent and Trademark Office patent file or records, but otherwise reserves all copyright rights whatsoever in the computer program listing.

Various other modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A video combiner for combining a plurality of spatially transformed fill video signals with a background video signal, wherein said plurality of spatially transformed fill video signals have a plurality of Z video data associated therewith, said video combiner comprising:

video receiver means for receiving a background video signal and a plurality of spatially transformed fill video signals, wherein each of said received plurality of spatially transformed fill video signals has planar Z coefficient data corresponding thereto;

data receiver means for receiving Z plane difference data representing a differential plane corresponding to said planar Z coefficient data, wherein said Z plane difference data includes predetermined horizontal differential coefficients, predetermined vertical differential coefficients and predetermined offset differential constants;

Z priority signal generator means for generating a single Z priority signal dynamically responsive to said received Z plane difference data, wherein said generated single Z priority signal represents relative keying priority for said received plurality of spatially transformed fill video signals; and video combiner means for combining said received plurality of spatially transformed fill video signals with said received background video signal in accordance with said generated single Z priority signal, comprising:

key receiver-prioritizer means for receiving and prioritizing a plurality of key signals in accordance with said generated single Z priority signal to produce a prioritized plurality of key signals; and keyer means for keying said received plurality of spatially transformed fill video signals onto said received background video signal in accordance with said prioritized plurality of key signals.

2. A video combiner as recited in claim 1, wherein said Z priority signal generator means generates said single Z priority signal with a normalized dynamic signal range.

3. A video combiner as recited in claim 2, wherein said Z priority signal generator means comprises:
    clock receiver means for receiving a pixel count clock and a line count clock;
    data signal combiner means for combining said received Z plane difference data with said received pixel and line count clocks, and for providing said single Z priority signal; and
    scaler means for selectively scaling said single Z priority signal.

4. A video combiner as recited in claim 3, wherein said data signal combiner means comprises a multiplier and adder mutually coupled for combining said received Z plane difference data with said received pixel and line count clocks, and for providing said single Z priority signal substantially according to the formula:

$$Z = \Delta A X + \Delta B Y + \Delta C$$

where:
    Z = said single Z priority signal
    X = said received pixel count clock
    Y = said received line count clock
    $\Delta A$ = said predetermined horizontal differential coefficients
    $\Delta B$ = said predetermined vertical differential coefficients
    $\Delta C$ = said predetermined offset differential constants.

5. A video combiner as recited in claim 3, wherein said scaler means comprises a variable signal gain and signal clipping control circuit.

6. A video combiner as recited in claim 1, further comprising computer means for providing said Z plane difference data.

7. A video combiner as recited in claim 1, wherein said data receiver means comprises a digital-to-analog converter means for receiving and converting said Z plane difference data to a plurality of analog coordinate signals selectively representing said predetermined horizontal and vertical differential coefficients and said predetermined offset differential constants.

8. A video combiner as recited in claim 1, wherein said Z priority signal generator means comprises:
    clock receiver means for receiving a pixel count clock and a line count clock; and
    data signal combiner means for combining said received Z plane difference data with said received pixel and line count clocks, and for providing said single Z priority signal.

9. A video combiner as recited in claim 8, wherein said data signal combiner means comprises a multiplier and adder mutually coupled for combining said received Z plane difference data with said received pixel and line count clocks, and for providing said single Z priority signal substantially according to the formula:

$$Z = \Delta A X + \Delta B Y + \Delta C$$

where:
    Z = said single Z priority signal

X=said received pixel count clock
Y=said received line count clock
ΔA=said predetermined horizontal differential coefficients
ΔB=said predetermined vertical differential coefficients
ΔC=said predetermined offset differential constants.

10. A video combiner as recited in claim 1, wherein said key receiver-prioritizer means comprises a plurality of cross faders.

11. A video combiner as recited in claim 1, wherein said keyer means comprises a plurality of multipliers and an adder mutually coupled for selectively multiplying and adding, respectively, said received plurality of spatially transformed fill video signals and said received background video signal with said prioritized plurality of key signals.

12. A video combining method for combining a plurality of spatially transformed fill video signals with a background video signal, wherein said plurality of spatially transformed fill video signals have a plurality of Z video data associated therewith, said video combining method comprising the steps of:
receiving a background video signal and a plurality of spatially transformed fill video signals, wherein each of said received plurality of spatially transformed fill video signals has planar Z coefficient data corresponding thereto;
receiving Z plane difference data representing a differential plane corresponding to said planar Z coefficient data, wherein said Z plane difference data includes predetermined horizontal differential coefficients, predetermined vertical differential coefficients and predetermined offset differential constants;
generating a single Z priority signal dynamically responsive to said Z plane difference data, wherein said single Z priority signal represents relative keying priority for said plurality of spatially transformed fill video signals; and
combining said plurality of spatially transformed fill video signals with said background video signal in accordance with said single Z priority signal by performing the steps of:
receiving a plurality of key signals;
prioritizing said plurality of key signals in accordance with said single Z priority signal to produce a prioritized plurality of key signals; and
keying said plurality of spatially transformed fill video signals onto said received background video signal in accordance with said prioritized plurality of key signals.

13. A video combining method as recited in claim 12, wherein said step of generating said single Z priority signal comprises generating said single Z priority signal with a normalized dynamic signal range.

14. A video combining method as recited in claim 13, wherein said step of generating said single Z priority signal comprises the steps of:
receiving a pixel count clock and a line count clock;
combining said Z plane difference data with said pixel and line count clocks and providing said single Z priority signal; and
selectively scaling said single Z priority signal.

15. A video combining method as recited in claim 14, wherein said step of combining said Z plane difference data with said pixel and line count clocks and providing said single Z priority signal comprises multiplying said Z plane difference data with said received pixel and line count clocks and adding the products thereof substantially according to the formula:

$$Z = \Delta A X + \Delta B Y + \Delta C$$

where:
Z=said single Z priority signal
X=said pixel count clock
Y=said line count clock
ΔA=said predetermined horizontal differential coefficients
ΔB=said predetermined vertical differential coefficients
ΔC=said predetermined offset differential constants.

16. A video combining method as recited in claim 14, wherein said step of selectively scaling said single Z priority signal comprises selectively controlling signal gain and clipping of said single Z priority signal.

17. A video combining method as recited in claim 12, further comprising the step of programmably providing said Z plane difference data.

18. A video combining method as recited in claim 12, wherein said step of receiving said Z plane difference data comprises receiving and converting digital Z plane difference data to a plurality of coordinate signals selectively representing said predetermined horizontal and vertical differential coefficients and said predetermined offset differential constants.

19. A video combining method as recited in claim 12, wherein said step of generating said single Z priority signal comprises the steps of:
receiving a pixel count clock and a line count clock; and
combining said Z plane difference data with said pixel and line count clocks and providing said single Z priority signal.

20. A video combining method as recited in claim 19, wherein said step of combining said Z plane difference data with said pixel and line count clocks and providing said single Z priority signal comprises multiplying said Z plane difference data with said pixel and line count clocks and adding the products thereof substantially according to the formula:

$$Z = \Delta A X + \Delta B Y + \Delta C$$

where:
Z=said single Z priority signal
X=said pixel count clock
Y=said line count clock
ΔA=said predetermined horizontal differential coefficients
ΔB=said predetermined vertical differential coefficients
ΔC=said predetermined offset differential constants.

21. A video combining method as recited in claim 12, wherein said step of prioritizing said plurality of key signals comprises selectively cross-fading said plurality of key signals in accordance with said single Z priority signal.

22. A video combining method as recited in claim 12, wherein said step of keying said plurality of spatially transformed fill video signals onto said received background video signal comprises selectively multiplying said plurality of spatially transformed fill video signals and said received background video signal with said prioritized plurality of key signals and adding the products thereof.

* * * * *